United States Patent

[11] 3,525,363

| [72] | Inventors | William C. Gore<br>Elgin, Illinois;<br>Eugene B. Shapiro, Highland Park, Illinois |
|---|---|---|
| [21] | Appl. No. | 749,700 |
| [22] | Filed | Aug. 2, 1968 |
| [45] | Patented | Aug. 25, 1970 |
| [73] | Assignee | Chicago Specialty Manufacturing Company<br>a corporation of Illinois |

[54] MEANS FOR CONTROLLING THE DIRECTION OF THE FLOW OF A LIQUID OR FLUID THROUGH A SELECTED OUTLET
10 Claims, 7 Drawing Figs.

[52] U.S. Cl. .................................................. 137/625.47,
251/182, 251/309
[51] Int. Cl. ...................................................... F16k 5/16
[50] Field of Search........................................... 137/625.47,
625.41; 251/312, 309, 317, 287, 288, 181, 182

[56] References Cited
UNITED STATES PATENTS

| 629,648 | 7/1899 | Boatenreiter................ | 137/625.47X |
| 1,077,697 | 11/1913 | Gates........................... | 137/625.47 |
| 1,458,644 | 6/1923 | Dempsey...................... | 251/312 |
| 2,547,831 | 4/1951 | Mueller........................ | 251/309X |
| 3,276,472 | 10/1966 | Jinkens et al................ | 137/625.41 |

FOREIGN PATENTS

| 1,124,629 | 7/1956 | France......................... | 137/625.16 |
| 613,540 | 12/1960 | Italy............................ | 251/309 |
| 77,497 | 8/1917 | Switzerland................. | 137/625.47 |

Primary Examiner— M. Cary Nelson
Assistant Examiner— Michael O. Sturm
Attorney— Max R. Kraus

ABSTRACT: The device includes a housing within which is supported a manually rotatable member, with the housing having a plurality of outlets so that by manually rotating the rotatable member the liquid or fluid can be discharged through the selected outlet. It has particular application to bathroom showers, although it is not limited thereto.

Patented Aug. 25, 1970 3,525,363
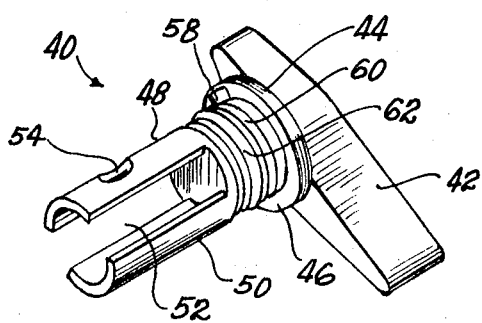
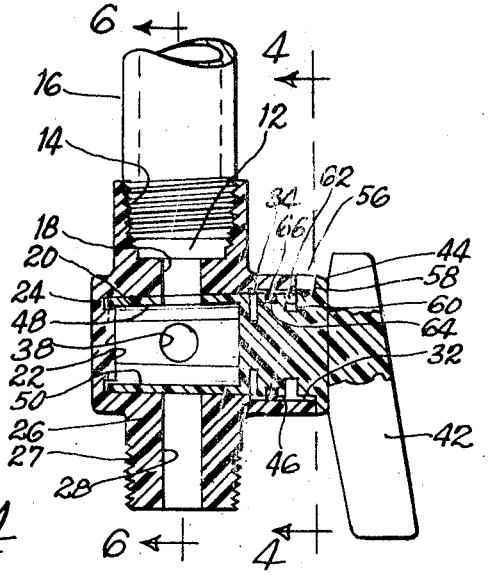
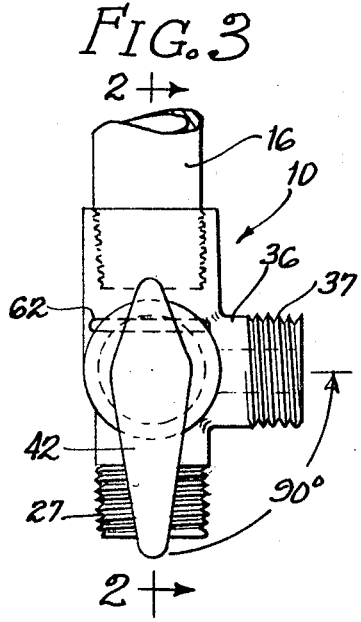
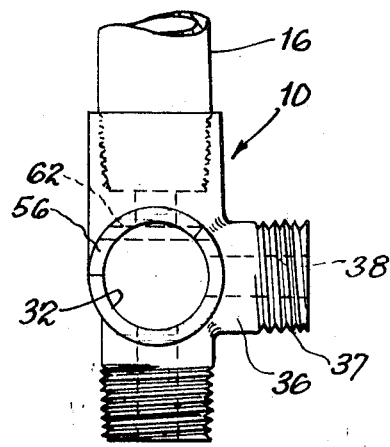
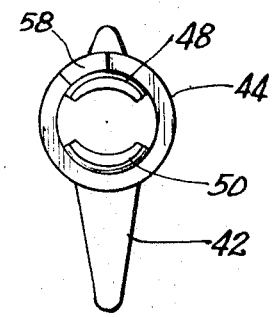
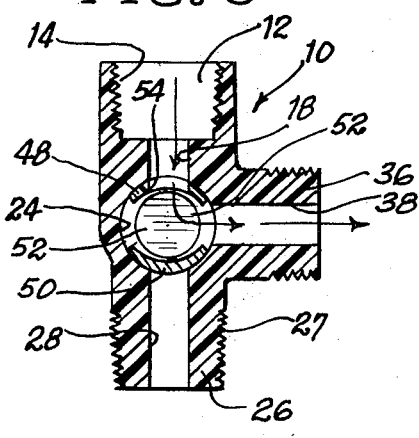
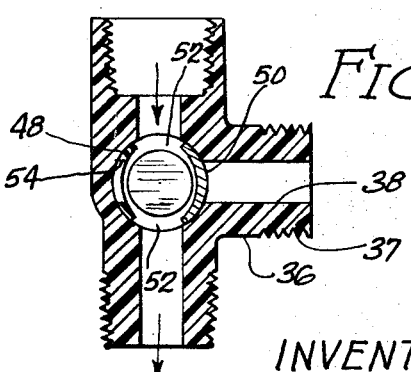
INVENTORS
William C. Gore
Eugene B. Shapiro
by Max R. Kraus
Att'y

MEANS FOR CONTROLLING THE DIRECTION OF THE FLOW OF A LIQUID OR FLUID THROUGH A SELECTED OUTLET

BRIEF SUMMARY OF THE INVENTION

One of the objects of this invention is to provide a very simple and inexpensive device which may be manually operated for controlling the discharge of the liquid or fluid passing therethrough through selective outlet ends.

Another object of this invention is to provide a diverter or valve member for selectively controlling the flow of the liquid or fluid through either one or the other of a plurality of outlets.

Another object of this invention is to provide a structure of the foregoing character which may be molded of plastic material and which is very economical to produce and easy to assemble.

Other objects will become apparent as this description progresses.

BRIEF DESCRIPTION OF THE DRAWINGS

In the drawings:

FIG. 1 is a perspective view of the manually rotatable member.

FIG. 2 is a central sectional view of the device taken on line 2—2 of FIG. 3.

FIG. 3 is an elevational view looking at same from the handle.

FIG. 4 is a view similar to FIG. 3 and taken on line 4—4 of FIG. 2, but with the manually rotatable member removed.

FIG. 5 is an end elevational view of the rotatable member looking at same from the end opposite that of the handle.

FIG. 6 is a sectional view taken on line 6—6 of FIG. 2, and

FIG. 7 is a sectional view similar to FIG. 6, but with the rotatable member rotated 90° from that of FIG. 6.

The device includes a housing or body generally indicated by the numeral 10 which may be molded of plastic material. The housing has an upper inlet end designated by the numeral 12 which is a bore and which is internally threaded as at 14 so that it may be coupled or connected to the input pipe 16. Communicating with the inlet bore 12 is a port or passageway 18 of a reduced dimension which in turn communicates with a centrally positioned tubular or cylindrical-shaped bore 20 which extends transversely of the housing and which tapers towards the bottom end wall 22 of the bore. An annular recess 24 is formed in the bottom end wall 22 to accommodate the ends of the cantilever arms of the rotatable member, presently to be described.

The housing 10 has a lower end 26 which is externally threaded as at 27. The lower end has a bore 28 which communicates with the central transverse bore 20 but which is in direct axial alinement with the bore or passageway 18. For purpose of this specification, the lower outlet end 26 may sometimes hereinafter be referred to as a first outlet. A shower head, not shown, is adapted to be attached or coupled to the lower end 26 of the body through the medium of the threads 27.

The body or housing 10 has a lateral extension 30 which is alined with the transverse bore 20 and said extension has a bore 32 communicating with the central transverse bore 20. The bore 32 has a slightly larger diameter than the diameter of the front end of the transverse bore 20. A shoulder 34 is provided therebetween.

The body or housing 10 has another lateral extension 36 which is positioned 90° from the lateral extension 30. The lateral extension 36 is externally threaded as at 37 and has a bore 38 which communicates with the central transverse bore 20, as best seen in FIGS. 6 and 7. A flexible spray pipe, not shown, is adapted to be attached or coupled to the lateral extension 36 through the medium of the threads 37. This outlet in extension 36 may sometimes hereinafter be referred to as a second outlet.

Rotatably supported within the housing 10 is a rotatable member generally designated by the numeral 40 and best shown in perspective in FIG. 1, which is preferably molded of plastic or the like, and consists of a handle 42, an annular head 44, an annular neck or stem 46 of reduced diameter, and a pair of diametrically opposed spaced curvilinear or arcuate-shaped members or arms, one of which is designated by the numeral 48 and the other designated by the numeral 50. The spacing of the arms 48 and 50 provide a pair of longitudinal ports 52, one on each side of the arms, which are in alinement and which serve as passageways for the flow of the liquid or fluid, as will be subsequently described.

The arm 48 has an opening or port 54 which when the rotatable member 40 is inserted into the housing is adapted to register or aline with the bore 18. When the rotatable member 40 is inserted into the tapered transverse bore 20 in the body, the linearly straight but radially curved arms 48 and 50 deflect towards each other and this causes the arms to assume the same tapered diameter of the transverse bore 20 in the body 10. The ends of the arms 48 and 50 are positioned in the annular recess 24 in the end wall of the body. As best seen in FIG. 2, the neck or stem 46 of the rotatable member 40 is positioned within the bore of the lateral extension 30, with the annular head 44 abutting against the outside edge of the lateral extension.

The lateral extension 30 of the housing is provided with a 90° radial slot 56 at the edge of the extension to provide an open face slot. A detent 58 formed on the neck of the rotatable member 40 rides in said open face slot 56. The detent is adjacent the head 44 of said rotatable member. The 90° radial slot 56 and the detent 58 permits the rotatable member to be rotated 90°.

The neck or stem of the rotatable member 40 is provided with an annular groove or slot 60 which is engaged by a locking pin 62 inserted through a suitable opening in the lateral extension 30 of the housing to retain the rotatable member 40 within the housing. The neck or stem 46 of the rotatable member 40 has an annular recess 64 to accommodate a standard O-ring 66 to form a leak-proof connection between the rotatable member and the housing.

While the invention herein is not limited for use with a shower unit, one of its applications is for that purpose. In any case, the input or inlet bore 12 is threadedly connected to the input water pipe 16, or a shower unit, and the opposite outlet end 26 is threadedly connected to a shower head or the like. The lateral extension 36 is externally threaded and can be connected to a flexible hose (not shown) for a personal shower or the like.

The operation of the device will be apparent from the foregoing but briefly described as follows. When the handle 42 is in the position shown in FIGS. 2 and 3, the flow will be as shown in FIG. 6, i.e., the port 54 of the arm 48 of the rotatable member 40 will be in registry with the port or bore 18, with the other arm 50 closing the entrance into the lower outlet bore 28. In this position any water or fluid coming through the input pipe 16 into the inlet end would pass through the port 18, through the opening or port 54 in the arm 48, impinge against or be deflected by the lower arm 50 and be directed outwardly through the longitudinal port 52 of the rotatable member and through the bore 38 in the lateral extension 36. If a flexible hose is connected to the lateral extension 36 then the water will pass out through the flexible hose for a personal shower or the like.

By rotating the handle 42 counterclockwise 90°, the arms 48 and 50 are positioned as shown in FIG. 7, so that the two opposed longitudinal ports 52 between the arms are in registry with the upper inlet bore 18 and the lower outlet bore 28, in which case the water will pass through these alined bores 18 and 28 and be discharged through the lower outlet end 26 and through the shower head (not shown), but attached thereto. When it is desired to close off the outlet end 26 and have the water pass through the lateral outlet end 36, the handle 42 is rotated clockwise 90°.

With this invention a diverter is provided which consists of relatively few parts, is of durable construction, is very inexpensive and yet very effective.

It will be understood that various changes and modifications may be made from the foregoing without departing from the spirit and scope of the appended claims.

We claim:

1. Means for controlling the direction of flow of a liquid or fluid to a selected outlet, said means comprising a housing having an inlet and a first outlet and a second outlet with said second outlet offset with respect to said first outlet, said housing having a central bore with ports communicating with said inlet and said first and second outlets, said central bore tapering inwardly toward the end wall of said housing, a rotatable member positioned in said bore, said rotatable member having a pair of diametrically opposed spaced curvilinear arms adapted to nest within the tapered central bore, said tapering bore causing said arms to deflect toward each other so that the arms apply pressure against the ports communicating with said central bore, said spaced arms defining ports therebetween adapted to be selectively positioned in registry with said inlet port and with said first and second outlet ports when said rotatable member is rotated to direct the flow either through said first outlet port or through said second outlet port.

2. A device as defined in claim 1 in which the inlet port and the first outlet port are in axial alinement and in which one of said arms has a port therein adapted to register with the inlet port and with the other arm closing the first outlet port to deflect the flow through the second outlet port at substantially right angles to the first outlet port, and wherein when said rotatable member is rotated approximately 90° the arms will permit the flow to pass therebetween and to be discharged through said first outlet port.

3. A device as defined in claim 2 in which the spaced arms define diametrically spaced ports which when in registry with the inlet port and the first outlet port directs the flow through the first outlet port.

4. A device as defined in claim 1 in which the central bore of the housing extends transversely of the inlet and the first outlet.

5. A device as defined in claim 4 in which the rotatable member is formed integrally of a plastic material and has a manually operable handle to permit rotation of said rotatable member.

6. A device as defined in claim 1 in which the rotatable member has a stem having a radial slot adapted to be engaged by a pin on said housing for rotatably locking said rotatable member in said housing.

7. A device as set forth in claim 6 in which the stem of said rotatable member has a detent and in which the housing has a radial slot of approximately 90° to permit rotation of a radius of approximately 90° of said rotatable member in said housing.

8. A structure as defined in claim 1 in which the housing and the rotatable member are each integrally molded of plastic material and in which the rotatable member includes a handle portion to be manually engaged for rotating said rotatable member.

9. A device as set forth in claim 1 in which one of the arms has a port.

10. A device as set forth in claim 1 in which the end wall of the housing has an annular recess for receiving the ends of the arms.